United States Patent [19]

Bankstahl

[11] 4,244,454
[45] Jan. 13, 1981

[54] CONE CLUTCH

[75] Inventor: Herbert A. Bankstahl, Fond du Lac, Wis.

[73] Assignee: Brunswick Corporation, Skokie, Ill.

[21] Appl. No.: 34,521

[22] Filed: Apr. 30, 1979

[51] Int. Cl.³ .................. F16D 11/04; F16D 21/00; F16D 21/04
[52] U.S. Cl. .................. 192/21; 192/51; 192/93 R; 192/48.91
[58] Field of Search .......... 192/48.91, 21, 51, 93 R

[56] References Cited

U.S. PATENT DOCUMENTS

| | | | |
|---|---|---|---|
| 907,541 | 12/1908 | Van Auken | 192/21 X |
| 2,281,885 | 5/1942 | Litle | 192/21 X |
| 2,718,792 | 9/1955 | Kiekhaefer | 192/93 R |
| 3,145,401 | 8/1964 | Burg | 192/51 X |
| 3,165,005 | 1/1965 | Bergonzo . | |
| 3,212,349 | 8/1966 | Bergstedt . | |
| 3,269,497 | 8/1966 | Bergstedt | 192/93 R |
| 3,915,270 | 10/1975 | Miller . | |
| 3,923,131 | 12/1975 | LaFollette | 192/51 X |
| 3,977,503 | 8/1976 | Hurst . | |

FOREIGN PATENT DOCUMENTS 1298734  6/1962  France ......................... 192/51

*Primary Examiner*—George H. Krizmanich
*Attorney, Agent, or Firm*—O. Thomas Sessions

[57] ABSTRACT

A cone clutch mechanism has its forward and reverse clutch gears supported by bearings mounted on the housing, with a main shaft supported by bearings mounted on the housing in the same planes as the forward and reverse gear bearings. The male cone member is biased by two springs, each encircling cam faces on the member and bearing against the forward and reverse clutch gears, respectively, to bias the cone member away from its center or neutral position.

8 Claims, 3 Drawing Figures

CONE CLUTCH

BACKGROUND OF THE INVENTION

This invention relates to a gear shifting mechanism and particularly to a reversing mechanism for marine drives of the type having an axially movable central clutch sleeve element supported for rotation with a main shaft and positioned between forward and reverse gears, each having a clutch face.

Prior reversing mechanisms for marine drives have included a variety of dog clutches and cone clutches. The prior cone clutch devices have encountered problems with clutch surface wear, difficult assembly procedures, and complex external shifting linkages subject to corrosion and damage.

SUMMARY OF THE INVENTION

The inventor has found that in a reversing clutch mechanism of the forementioned type clutch wear can be reduced by supporting the forward and reverse clutch gears by bearings on the housing, the bearings being in approximately the same plane as the gear teeth. Further support is given by mounting the main shaft bearings on the housing in the same plane as the forward and reverse gear bearings. Smooth shifting is assured by a spring means for biasing the clutch sleeve away from its central or neutral position.

DESCRIPTION OF THE PREFERRED EMBODIMENT

Figure 1:
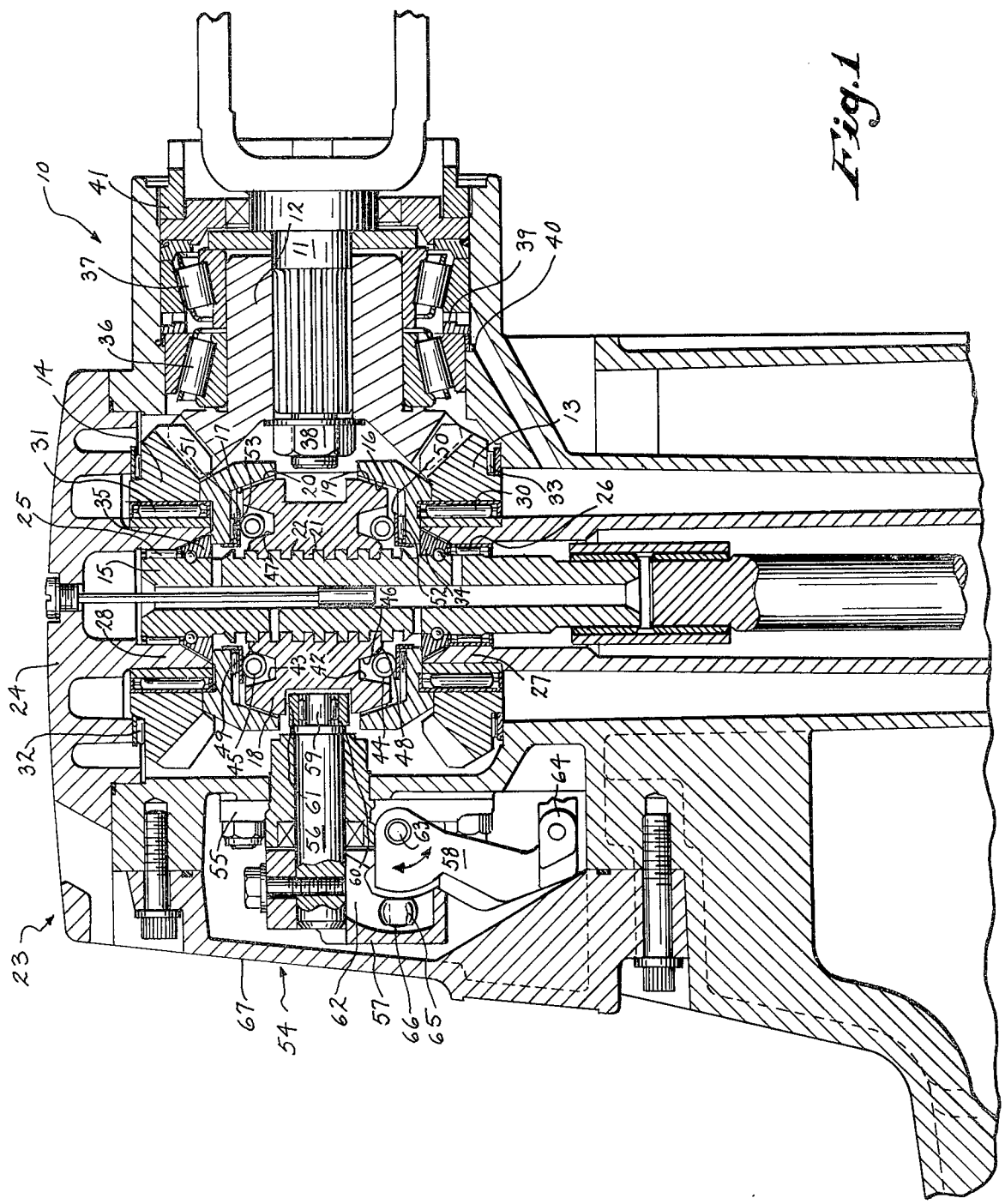
FIG. 1 is a side elevation view in section of the upper portion of a stern drive showing the reversing mechanism of the invention.
Figure 2:
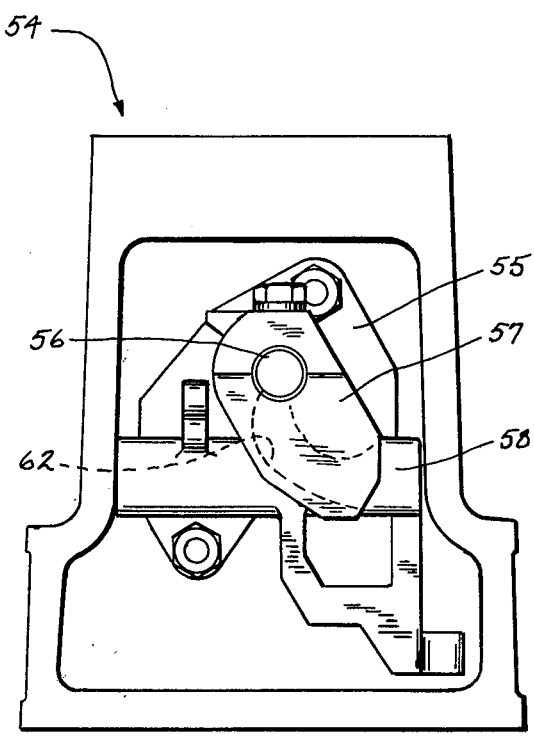
FIG. 2 is an end view of the shifting linkage of FIG. 1.

FIG. 1 shows a reversing clutch mounted in the upper portion of a marine stern drive unit 10. As is well known in such arrangements an input shaft 11 carries an input bevel gear 12 which drives the counterrotating forward bevel gear 13 and reverse bevel gear 14 which rotate about the main shaft 15. The forward and reverse gears 13 and 14 each have an internal conical clutch surface, 16 and 17, attached by welding, facing each other. The main shaft 15 carries a sleeve member 18 between the clutch gears 13 and 14, the sleeve member 18 having conical clutch faces 19 and 20 on each end for mating with the forward and reverse gears. The sleeve member 20 has internal helical splines 21 engaged with helical splines 22 on the main shaft 15. When the clutch sleeve 18 is engaged with either the forward or reverse clutch gear 13 or 14, the torque applied by the forward or reverse clutch gear 13 or 14 to the clutch sleeve 18 causes the helical splines 21 and 22 to screw the sleeve 18 along the shaft 15 toward the clutch gear with which it is engaged, thereby driving the main shaft 15 in either forward or reverse. The main shaft 15 in turn, extends downward to drive a propeller, not shown.

In the preferred embodiment a top cover 24 is attached to the gear housing 23 by machine screws, not shown. The main shaft 15 is supported for rotation by the upper and lower main needle bearings 25 and 26 which are mounted on the inside of annular projections 27 and 28 extending from the top cover 24 and the lower housing, respectively. Mounted on the outside of the annular projections 27 and 28, in substantially the same plane as the main bearings and the gear teeth, are the forward and reverse gear needle bearings 30 and 31 which carry the forward and reverse clutch gears 13 and 14. Thrust bearings 32 and 33 are mounted on the housing to position the forward and reverse gears 13 and 14 and support the axial loads thereon. Thrust collars 34 and 35, fixed to the main shaft 15, bear against outside surfaces of the forward and reverse gears 13 and 14. Input gear 12 is supported by bearings 36 and 37 which are axially loaded by nut 38 which attaches input shaft 11 to input gear 12. Between the bearings 36 and 37 is a collar 39 which serves to axially position the assembly against a surface 40 machined on gear housing 23. Threaded collar 41 forces collar 39 against the housing 23. Because the housing surfaces on which the bearings rest can be accurately machined, precise location of the forward and reverse gears 13 and 14 relative to the input bevel gear 12 is assured. This arrangement substantially eliminates forces that would tend to misalign the clutch faces, accurately positions the gears, thereby extending the useful life of the unit, and simplifies assembly of the drive unit components.

To provide a smooth, uniform shifting action, the clutch sleeve 18 has grooves 42 and 43 on each end with coil springs 44 and 45, acting as garter springs, placed in tension encircling the main shaft 15, within each groove 42 and 43. Each groove 42 and 43 has two cam surfaces on which the coil springs are supported. The axially inward cam surfaces 46 and 47 are sloped at twenty degrees to the axis of the main shaft, while the axially outward cam surfaces 48 and 49 are sloped at forty-five degrees. As a result the coil springs 44 and 45 are always biased axially outward from the end grooves 42 and 43 to push against thrust plates 50 and 51 which in turn ride on bearings 52 and 53 which bear against forward and reverse gears 13 and 14. The intersections of the 45 degree and 20 degree cam faces are placed to locate the coil springs 44 and 45 very nearly on the intersections when the clutch sleeve 18 is in the neutral position, halfway between the forward and reverse gears 13 and 14.

When the clutch sleeve 18 is moved away from its neutral position, say toward the forward gear 13, one spring 45 will ride down onto its 45 degree cam face 49 while the other spring 44 will ride up onto its 20 degree cam face 46. As a result the axial force produced by the one spring 45 will increase and the other will decrease, producing a net force to push the clutch sleeve 18 into engagement with the forward gear 13. The spring 44 riding on the 20 degree cam face 46 will act to provide a minimum axial load on the forward gear's thrust plate 50 while the spring 45 will provide an axial load to hold gear 14 in splace. Thus a smooth, uniform shifting action will result, since substantially the same force will be applied to the clutch sleeve 18 every time it is shifted. Of course, shifting to reverse is the converse of shifting to forward.

Figure 3:
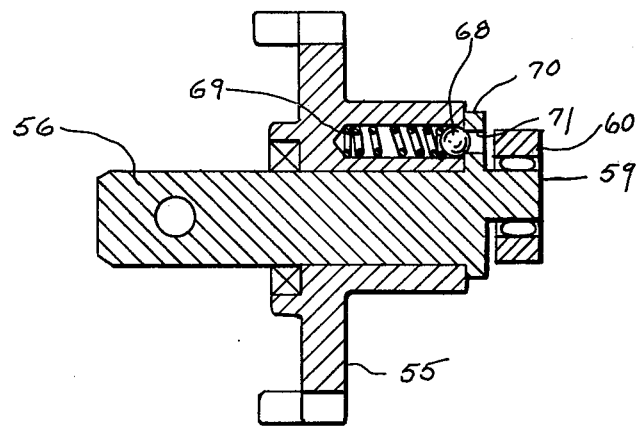
FIG. 3 is a top sectional view of the actuator shaft and shifter housing illustrating the neutral detent mechanism.

Shift control of the clutch sleeve 18 is achieved by a shifter mechanism 54 which includes a shifter housing 55, an actuator shaft 56, a shift lever 57 and a bell crank 58. The actuator shaft 56 is mounted for rotation in the shifter housing 55. As shown in FIG. 3, one end 59 of the actuator shaft 56 is radially offset and carries an eccentric roller 60 which rides in an annular shift groove 61 in the clutch sleeve. As the actuator shaft 56 is rotated, the eccentric roller 60 moves in an arc, thereby moving the clutch sleeve 18 axially. The eccentric roller 60 is circular, but has its center hole offset slightly, about 0.01 inch (0.25 mm), to produce a vibrating force against the side wall of the shift groove 61 while shifting. The vibrating force is desirable when shifting out of gear because of the locking action produced by the helical splines on the main shaft 15 and on the clutch sleeve 18 when the clutch is engaged.

Fixed to the other end of the actuator shaft 56 is the shift lever 57. The shift lever 57 extends radially outward from the actuator shaft 56 and has a cam groove 62 curving out and away from the actuator shaft 56. A bell crank 58 is pivotally attached to the shifter housing 55 by a pin 63. One end 64 of the bell crank 58 is attached to a shift cable, not shown, so that axial movement of the shift cable causes the bell crank 58 to rotate about its pin 63. A cam follower 65 is attached to a shaft 66 on the bell crank 58 and rides in the cam groove 62 on the shift lever 57. Axial movement of the shift cable will rotate the bell crank 58, causing the cam follower 65 to drive the shift lever 57 and rotate the actuator shaft 56 thereby moving the clutch sleeve 18 axially to engage or disengage the clutch faces. The entire shifter mechanism is attached to the gear housing and protected by a shifter cover 67.

A detent mechanism, illustrated in FIG. 3, is provided in the actuator shaft 56 and shifter housing 55 to hold the shifter in the neutral position when desired. This mechanism has a ball 68 loaded by a spring 69 in the shifter housing 55 pushing against the flange 70 on actuator shaft 56. The flange 70 has a small hole 71 for engaging the ball 68 in the neutral position.

I claim:

1. A clutch apparatus comprising:
   (A) a housing;
   (B) a main shaft;
   (C) first and second main bearings supporting said main shaft on said housing;
   (D) a forward gear having a clutch face on one side, said forward gear freely rotatable about said main shaft;
   (E) forward bearings supporting said forward gear on said housing, with said forward bearings in approximately the same plane as the gear teeth of said forward gear;
   (F) a reverse gear having a clutch face on one side facing said clutch face on said forward gear, said reverse gear freely rotatable about said main shaft;
   (G) reverse bearing supporting said reverse gear on said housing, with said reverse bearings in approximately the same plane as the gear teeth of said reverse gear;
   (H) a drive gear means for driving said forward and reverse gears in respectively opposite directions;
   (I) a sleeve member mounted on said main shaft between said forward and reverse gears, said sleeve member having:
      (a) a clutch face at each end, each selectively engageable with one of said clutch faces of said forward and reverse gears;
   (J) a shift means for selectively moving said sleeve member axially along said shaft to a forward or reverse drive position to engage one of said sleeve clutch faces with one of said forward or reverse gear clutch faces; and
   (K) a spring means for automatically forcing said sleeve member toward whichever of said drive positions said sleeve member is closest to.

2. The clutch apparatus defined in claim 1 wherein said spring means includes:
   (i) a pair of annular cam surfaces, one on each end of said sleeve member and
   (ii) a pair of coil springs, each biased against one of said cam surfaces.

3. The clutch apparatus defined in claim 2 wherein each of said coil springs are biased between one of said cam surfaces and said forward or reverse gear.

4. The clutch apparatus defined in claim 3 wherein each of said coil springs acts as a garter spring and is placed in tension encircling one of said cam surfaces.

5. The clutch apparatus defined in claim 4 wherein each of said cam surfaces have two external conical cam faces having different slopes.

6. A clutch apparatus comprising:
   (A) a main shaft;
   (B) a housing having first and second annular projection surrounding said main shaft;
   (C) first and second main bearings supporting said main shaft on said first and second annular projections;
   (D) a forward gear having a clutch face on one side, said forward gear freely rotatable about said main shaft;
   (E) forward bearings supporting said forward gear on said first annular projection with said forward bearings in approximately the same plane as the gear teeth of said forward gear and said first main bearing;
   (F) a reverse gear having a clutch face on one side facing said clutch face of said forward gear, said reverse gear freely rotatable about said main shaft;
   (G) reverse bearings supporting said reverse gear on said second annular projection with said reverse bearings in approximately the same plane as the gear teeth of said reverse gear and said second main bearing;
   (H) a drive gear means for driving said forward and reverse gears in respectively opposite directions;
   (I) a sleeve member mounted on said main shaft between said forward and reverse gears, said sleeve member having:
      (a) a clutch face at each end, each selectively engageable with one of said clutch faces of said forward and reverse gears; and
   (J) a shift means for selectively moving said sleeve member axially along said shaft to a forward or reverse drive position to engage one of said sleeve clutch faces with one of said forward or reverse gear clutch faces.

7. The clutch apparatus defined in claim 6 wherein said first and second main bearings are located radially inside said forward and reverse bearings, respectively.

8. The clutch apparatus defined in claim 6 wherein said main bearings and said forward and reverse bearings are needle bearings.

* * * * *